(No Model.)

J. M. BURKE.
DEVICE FOR SECURING FISH PLATES TO JOINTS OF RAILROAD RAILS.

No. 314,314. Patented Mar. 24, 1885.

WITNESSES:
A. G. Morey

INVENTOR
James Marlow Burke
BY G. L. Chapin
ATTORNEY

UNITED STATES PATENT OFFICE.

JAMES MARLOW BURKE, OF DUBLIN, IRELAND, ASSIGNOR TO HIMSELF, AND CHARLES A. CHAPIN AND HENRY SHACKELL, JR., BOTH OF MILWAUKEE, WISCONSIN.

DEVICE FOR SECURING FISH-PLATES TO JOINTS OF RAILROAD-RAILS.

SPECIFICATION forming part of Letters Patent No. 314,314, dated March 24, 1885.

Application filed August 29, 1884. (No model.) Patented in England September 29, 1884, No. 12,951.

*To all whom it may concern:*

Be it known that I, JAMES MARLOW BURKE, a subject of the Queen of Great Britain, and a resident of Dublin, Dublin county, Ireland, have invented new and useful Improvements in Devices for Securing Fish-Plates to the Joints of Railroad-Rails, of which the following is a specification, reference being had to the accompanying drawings, illustrating the invention and its application, in which—

Figure 1:
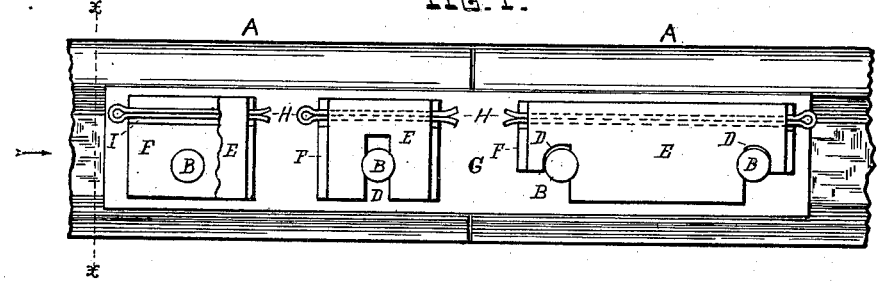
Figure 2:
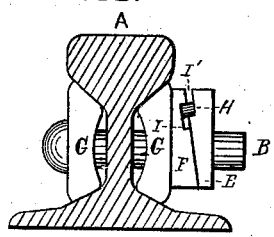
Figure 3:
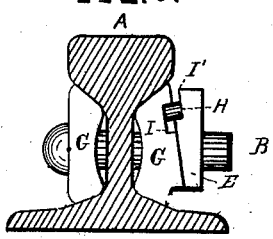
Figure 4:
Figure 5:
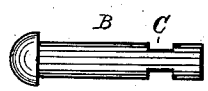
Figure 6:
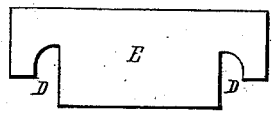
Figure 7:
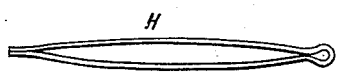

Figure 1 is an elevation of the abutting ends of two railroad-rails and my improved fastening devices applied thereto; Fig. 2, a transverse section of Fig. 1 on line X, looking in the direction of dart Z. Fig. 3 is a modification of Figs. 1 and 2, showing one "fish-plate" beveled and the wedge-clamps dispensed with. Figs. 4 and 5 represent two connecting-bolts, respectively provided with one and two notches; Fig. 6, an elevation of one wedge removed from the other parts; and Fig. 7 an elevation of one spring-key, also removed.

This invention has for its purpose the providing of better means for securing fish-plates to railroad-rails than the screw and nut.

The nature of the invention consists in wedge-shaped keys in which are provided open mortises on their lower edges to engage notches in the connecting-bolts, so that where the wedges are forced down by spring-keys, which have bearings in longitudinal grooves or seats in the wedges and in the one fish-plate or clamping-wedges, both plates will be drawn sufficiently tight against the rails to hold them to an even joint at their ends as against any strain which may be brought thereon, as demonstrated by a practical experiment on railway-tracks supporting both heavy and fast rolling-stock.

The advantages of the improvement are, first, a stronger joint is attained; second, the wedges will not work loose as nuts do, and whatever wear there may be in the parts by friction is compensated for by the spring-keys which automatically force the wedges farther down on the bolts; third, the fish-plates may be removed in case repairs are required in much less time than is the case where the fish-plates are clamped to the rails by bolts and nuts as is now done.

In the illustrations, A A represent portions of two rails having a modern modification in cross-section of the well-known T-rail. My invention is, however, to be used in any instance where fish-plates are employed to strengthen metal track-joints. The bolts are shown at B, which in all instances are formed with one or two side notches, C, Figs. 3 and 4, to engage the open mortises D in the wedge E. This wedge at Fig. 2 has an inner seat on a wedge-clamp, F, which by means of a hole through it is held on the bolt B and bears against the fish-plate G. The wedge E, bearing against the shoulder of the notch C and being driven down, brings the wedge-clamp E with such force against the plates that both will sufficiently clamp the rails.

To assist in forcing the wedge down and holding it there, a spring-key, H, is driven in a channel, I I', one half of which is formed in the wedge E and the other half in the wedge-clamp F, the outer edges of the key bearing, respectively, on the parts E and F, as more clearly shown at Fig. 2, whereby the tendency of the key is to force down the wedge F by its own spring-power, the spring of the key being sufficient to hold the wedge to its place after it has been driven there. A modification of this construction is shown at Fig. 3, where the fish-plate G is beveled, as shown, to serve the purpose of the clamping-wedge F, as in the other figures. This latter device with this exception is the same as that described, the one half-channel being formed in the inclined fish-plate in the same manner as in the wedge-clamp F, and it is employed on new roads where the fish-plates and my fastening device are made wholly for that purpose. The wedge-clamp F is employed to apply my device to the ordinary fish-plates and rails.

The notches C are made long enough to compensate for what variation there may be in the distances from outside to outside of the fish-plates in different constructions, the channels I I' being formed wide for the same purpose.

In practice four bolts, B, are employed at each joint of the rails and at Fig 2.

Two sets of wedges and wedge-clamps are shown, one set being used with double notched bolts, and the other set with single notched bolts, as at Fig. 1, and, where the two bolts are used on each rail A, one wedge, F, may be formed to engage them both, as shown at Figs. 1 and 6.

The spring-keys H should be made of steel, and the bolts B and wedges will be better if made of Bessemer steel or a like fine hard material.

I claim as my invention—

In devices for securing fish-plates to the joints of railroad-rails, two or more wedges, E, which are provided each with one or more open mortises on the under edges thereof, and half-channel I', horizontally on their inner sides with two fish-plates, one of which is beveled to form an incline against the wedges E, and is provided with a half-channel, I, or presents, by means of the wedge-clamp F, a like beveled surface and half-channel to the wedges E, in combination with the spring-keys H, whose opposite sides, respectively, have bearings in the respective half-channels I I', as and for the purpose hereinbefore specified.

JAMES MARLOW BURKE.

Witnesses:
R. I. E. GUERRINI,
*Clerk, Engineer's Office, Inchicore, Dublin.*
FREDK. McGINNESS,
*3 Woodfield Place, Inchicore, Dublin.*